(12) United States Patent
Le Roux et al.

(10) Patent No.: US 8,918,221 B2
(45) Date of Patent: Dec. 23, 2014

(54) ANALYTICS FOR CONSUMER POWER CONSUMPTION

(75) Inventors: Gaëlle Le Roux, Grasse (FR); Alastair Partington, St. Albans Herts (GB)

(73) Assignee: Accenture Global Services Limited, Dublin (IE)

( * ) Notice: Subject to any disclaimer, the term of this patent is extended or adjusted under 35 U.S.C. 154(b) by 207 days.

(21) Appl. No.: 13/012,331

(22) Filed: Jan. 24, 2011

(65) Prior Publication Data

US 2011/0184574 A1   Jul. 28, 2011

(30) Foreign Application Priority Data

Jan. 25, 2010   (EP) .................................... 10305078

(51) Int. Cl.
*G05D 3/12*   (2006.01)
(Continued)

(52) U.S. Cl.
CPC ......... *H02J 13/0024* (2013.01); *Y02B 70/3225* (2013.01); *G06Q 10/04* (2013.01); *Y02B 90/2638* (2013.01); *H02J 3/14* (2013.01); *Y02B 90/242* (2013.01); *Y02B 90/2623* (2013.01); *G06Q 50/06* (2013.01); *H02J 13/0062* (2013.01); *H02J 13/0079* (2013.01); *Y04S 10/60* (2013.01); *Y04S 20/322* (2013.01); *Y04S 40/124* (2013.01); *Y04S 20/222* (2013.01); *Y04S 10/30* (2013.01); *Y04S 40/122* (2013.01); *G01D 4/004* (2013.01); *Y02E 60/74* (2013.01)
USPC ............. 700/291; 700/22; 700/286; 700/295; 700/297; 707/102; 707/805; 709/224; 717/177

(58) Field of Classification Search
CPC ............ G06Q 50/06; H02J 3/14; H02J 3/382; G06F 17/30286; G01R 19/252
USPC ............ 700/291, 295, 286, 297, 22; 707/102, 707/805; 709/224; 717/177; 324/140
See application file for complete search history.

(56) References Cited

U.S. PATENT DOCUMENTS 5,696,695 A    12/1997 Ehlers et al.
6,583,521 B1 *  6/2003 Lagod et al. .................... 307/70
(Continued)

FOREIGN PATENT DOCUMENTS

CA    2729211 A1    7/2011
EP    2081273       7/2009
(Continued)

OTHER PUBLICATIONS

European Search Report and Written Opinion from corresponding European Application No. 10 30 5078 dated Jun. 9, 2010.
(Continued)

*Primary Examiner* — Tejal Gami
*Assistant Examiner* — Ziaul Karim
(74) *Attorney, Agent, or Firm* — Brinks Gilson & Lione

(57) ABSTRACT

A system and method for centralized statistical analysis and control of power consumption is provided. The centralized statistical analysis, performed by a centralized power utility management system, may then be compared with one or more goals of the customer. Based on the comparison of the statistical analysis with the one or more goals of the customer, one or more actions may be taken including controlling one or more appliances resident at the customer premises.

24 Claims, 6 Drawing Sheets

(51) Int. Cl.

| | |
|---|---|
| *G05D 5/00* | (2006.01) |
| *G05D 9/00* | (2006.01) |
| *G05D 11/00* | (2006.01) |
| *G05D 17/00* | (2006.01) |
| *G05D 23/00* | (2006.01) |
| *G05B 11/01* | (2006.01) |
| *G06F 7/00* | (2006.01) |
| *G06F 17/30* | (2006.01) |
| *G06F 15/173* | (2006.01) |
| *G06F 9/445* | (2006.01) |
| *G01R 19/10* | (2006.01) |
| *G06Q 10/04* | (2012.01) |
| *H02J 3/14* | (2006.01) |
| *G06Q 50/06* | (2012.01) |
| *H02J 13/00* | (2006.01) |
| *G01D 4/00* | (2006.01) |

(56) References Cited

U.S. PATENT DOCUMENTS

| | | | |
|---|---|---|---|
| 7,379,997 B2 * | 5/2008 | Ehlers et al. | 709/224 |
| 8,176,095 B2 * | 5/2012 | Murray et al. | 707/805 |
| 8,239,073 B2 * | 8/2012 | Fausak et al. | 700/295 |
| 8,359,124 B2 * | 1/2013 | Zhou et al. | 700/291 |
| 8,369,997 B2 * | 2/2013 | Valin | 700/286 |
| 2002/0072868 A1 | 6/2002 | Bartone et al. | |
| 2004/0260430 A1 | 12/2004 | Mansingh et al. | |
| 2005/0240427 A1 | 10/2005 | Crichlow | |
| 2008/0177423 A1 * | 7/2008 | Brickfield et al. | 700/291 |
| 2008/0177678 A1 | 7/2008 | Di Martini et al. | |
| 2008/0306985 A1 * | 12/2008 | Murray et al. | 707/102 |
| 2009/0045804 A1 * | 2/2009 | Durling et al. | 324/140 R |
| 2009/0062970 A1 * | 3/2009 | Forbes et al. | 700/295 |
| 2009/0276771 A1 * | 11/2009 | Nickolov et al. | 717/177 |
| 2009/0326725 A1 * | 12/2009 | Carlson et al. | 700/291 |

FOREIGN PATENT DOCUMENTS

| | | |
|---|---|---|
| EP | 2290328 A1 | 3/2011 |
| WO | 01/71881 A2 | 9/2001 |
| WO | 2003/085798 | 10/2003 |
| WO | 2005/040992 | 5/2004 |
| WO | 2007/121322 | 10/2007 |
| WO | 2008/088219 A1 | 7/2008 |

OTHER PUBLICATIONS

Examiner's First Report of Feb. 21, 2011, from corresponding Australian Patent Application No. 2011200317.

* cited by examiner

ANALYTICS FOR CONSUMER POWER CONSUMPTION

REFERENCE TO RELATED APPLICATION

This application claims the priority benefit of European Patent Application No. 10305078.7, filed on Jan. 25, 2010, which is incorporated herein by reference in its entirety.

BACKGROUND

1. Field of the Invention

The present invention relates generally to a system and method for analyzing power consumption, and more particularly to a system and method for statistically analyzing power consumption for a customer in order to reduce power consumption by the customer.

2. Related Art

Customers typically receive scant information from the utility company in terms of the amount of power consumed. Ordinarily, customers receive (along with the billing statement) the total amount of power consumed during a predetermined period (such as a monthly period). This sending of limited information is due to several reasons. First, the automatic meter reading (AMR) technology used in the customers' homes is often crude, providing little information other than the total amount of power being consumed. Second, the architecture of the power grid tends to create a one-way flow of information—from the customers' premises to the utility—and therefore provides little ability to provide meaningful feedback to the consumer. In this way, the consumer receives little help in reducing power consumption.

Recently, there have been developments in Smart Meters that generate more detailed power consumption information at the customers' premises. Smart Meters may include real-time or near real-time reading of power consumption, power outage notification, and power quality monitoring. However, the information consumers may receive using the Smart Meters may be relegated to real-time power consumption, limiting their use in enabling consumers to reduce their power consumption.

In addition, there are analytical tools that provide consumers the ability to analyze their power consumption. However, these tools are not integrated with any central authority for the Power Grid and are therefore of limited usefulness. Thus, there is a need for the central authority of the Power Grid to better analyze power consumption for a customer in order to reduce overall power consumption by the customers and overall carbon footprint.

BRIEF SUMMARY

The invention provides a system and method for centralized statistical analysis of power consumption for a customer in order to reduce power consumption by the customer. The centralized statistical analysis, performed by a centralized power utility management system, allows for use of data separate from the customer's power consumption, thereby providing better analysis.

The power consumption data at the customer's premises may be generated in a variety of ways. One way is by using Smart Meters, which generate power consumption data (such as gas and electricity usage) for a customer's premises. The data may then be sent to a power utility management system (via a dedicated communication channel, the Internet, wired/wireless telephone system, and/or the power grid). The power utility management system may then use an analytics engine to statistically analyze the data sent. The statistical analysis may comprise analyzing the data (such as examining historical data to determine past consumption or predict future consumption). For example, the statistical analysis may solely use data generated at the customer's premises (including historical data). As another example, the statistical analysis may use data separate from the data generated at the customer's premises, such as data from another customer's premises (including a similarly situated customer).

The statistical analysis may then be compared with one or more goals of the customer. Goals of the customer may include, for example: (1) energy usage reduction (such as reduction of one's carbon footprint); (2) comparison of the customer's energy usage with a predetermined energy usage (such as comparison to determine whether a customer's energy usage is consistent with what is expected for the customer's premises); (3) savings on utility bill; (4) fixed bill; and/or (5) potential tax savings. In this way, the statistical analysis may be analyzed with respect to data generated at the customer's premises (such as previous statistical analyses in order to determine changes in energy uses). Or, the statistical analysis may be compared with data that is generated separately from the customer's premises (such as data that is generated by a similarly situated customer).

Based on the comparison of the statistical analysis with the one or more goals of the customer, one or more actions may be taken including: (1) reporting the statistical analysis to the customer; (2) determining reason(s) for deviation from expected energy usage; (3) providing recommendations to meet the customer's goals (such as recommending changes in use or operation of one or more customer appliances to meet the customer's goal); (4) reporting how the customer's energy usage compared to other customer's usage (such as comparison with another customer with a comparable premises); and (5) controlling one or more appliances. For example, the goals of the customer may be determined, the analysis may be based on the determined goals and information may be provided to the customer (such as providing information regarding the results of the analysis of the determined goals to educate the customer), and one or more actions may be taken. In particular, the actions taken may be on the customer side (including manual actions of the customer in terms of modifying energy usage or automatic actions) and/or on the utility side (including controlling one or more appliances at the customer's premises).

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION OF THE DRAWINGS AND THE PRESENTLY PREFERRED EMBODIMENTS

By way of overview, the preferred embodiments described below relate to a method and system for statistically analyzing power consumption for a customer in a centralized manner in order to reduce power consumption by the customer. The method and system described herein may be used in combination with a power utility management system. Specifically, Smart Meters or sensors (resident at the customer's premises) may generate data that is sent to the power utility management system. The power utility management system, using an analytics engine, may thereafter analyze the data. Based on the analysis, the power utility management system may provide information to the customer (such as reporting information) and/or control commands (to control one or more devices). In this way, the method and system described herein allows for a more robust 2-way communication between the power utility management system and the customer's premises.

Figure 1:
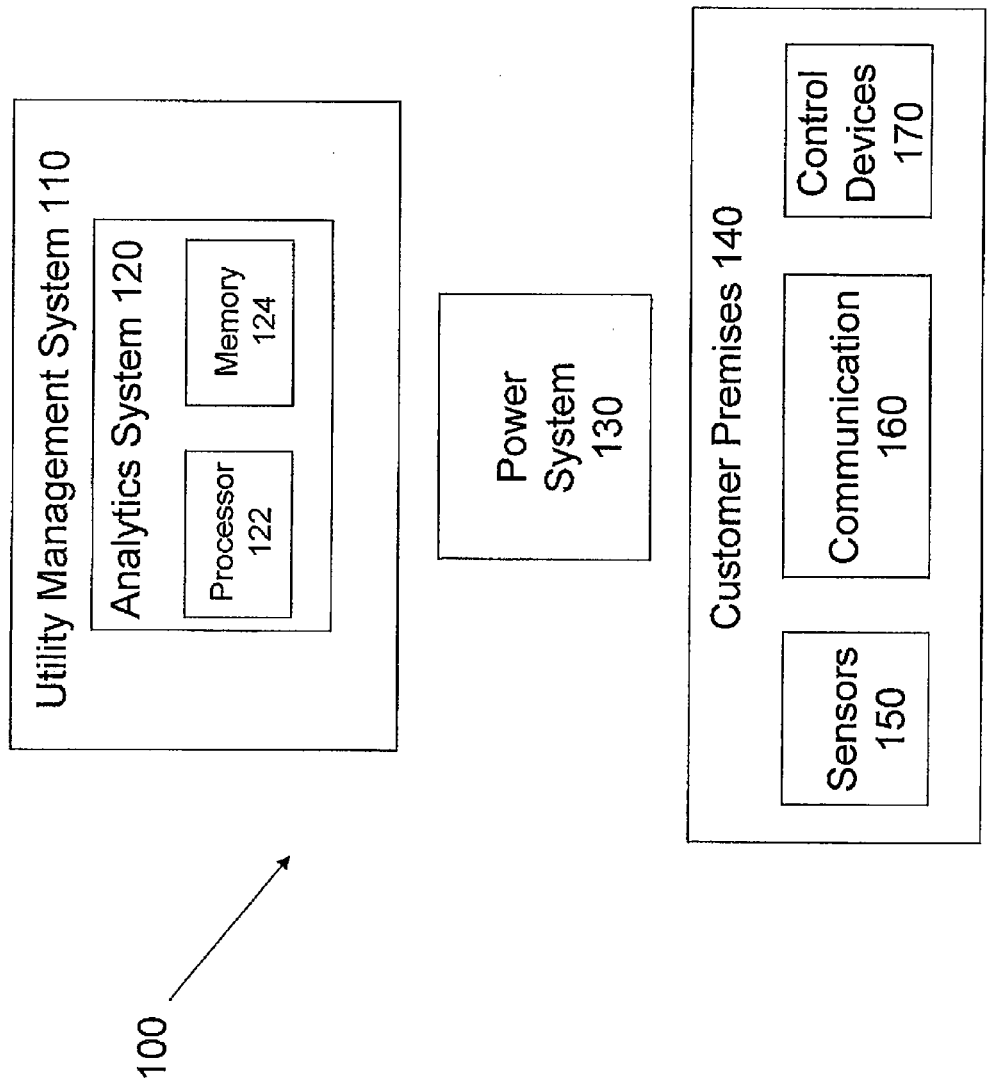
FIG. 1 is a block diagram of one configuration of the utility management system, power system, and customer premises.

Turning to the drawings, wherein like reference numerals refer to like elements, FIG. 1 illustrates is a block diagram of one configuration of the utility management system 110, power system 130, and customer premises 140. The utility management system 110 includes an analytics system 120, which may include an analytics engine and one or more databases, as discussed in more detail below. The analytics system 120 may include a processor 122 and a memory 124 that can communicate via a bus. The memory 124 may include volatile and/or non-volatile memory, and may include one or more programs. The memory 124 may be a main memory, a static memory, or a dynamic memory. The memory 124 may include, but may not be limited to, computer-readable storage media such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one case, the memory 124 may include a cache or random access memory for the processor 122. Alternatively or in addition, the memory 124 may be separate from the processor 122, such as a cache memory of a processor, the system memory, or other memory. The memory 124 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 124 may be operable to store instructions executable by the processor 122. The functions, acts or tasks illustrated in the figures (such as FIG. 4) or described herein may be performed by the programmed processor 122 executing the instructions stored in the memory 124. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system for the analytics system 120 may further include a display, such as a liquid crystal display (LCD), an organic light emitting diode (OLED), a flat panel display, a solid state display, a cathode ray tube (CRT), a projector, a printer or other now known or later-developed display device for outputting determined information. The display may act as an interface for the user to see the functioning of the processor 122, or specifically as an interface with the software stored in the memory 124 or in the drive unit.

Additionally, the computer system for the analytics system 120 may include an input device configured to allow a user to interact with any of the components of system. The input device may be a number pad, a keyboard, or a cursor control device, such as a mouse, or a joystick, touch screen display, remote control or any other device operative to interact with the system.

The computer system for the analytics system 120 may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory 124 and/or within the processor 122 during execution by the computer system. The memory 124 and the processor 122 also may include computer-readable media as discussed above.

The present disclosure contemplates a computer-readable medium that includes instructions or receives and executes instructions responsive to a propagated signal. The instructions may be implemented with hardware, software and/or firmware, or any combination thereof. Further, the instructions may be transmitted or received over the network via a communication interface. The communication interface may be a part of the processor 122 or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the system may be physical connections or may be established wirelessly.

Figure 2:
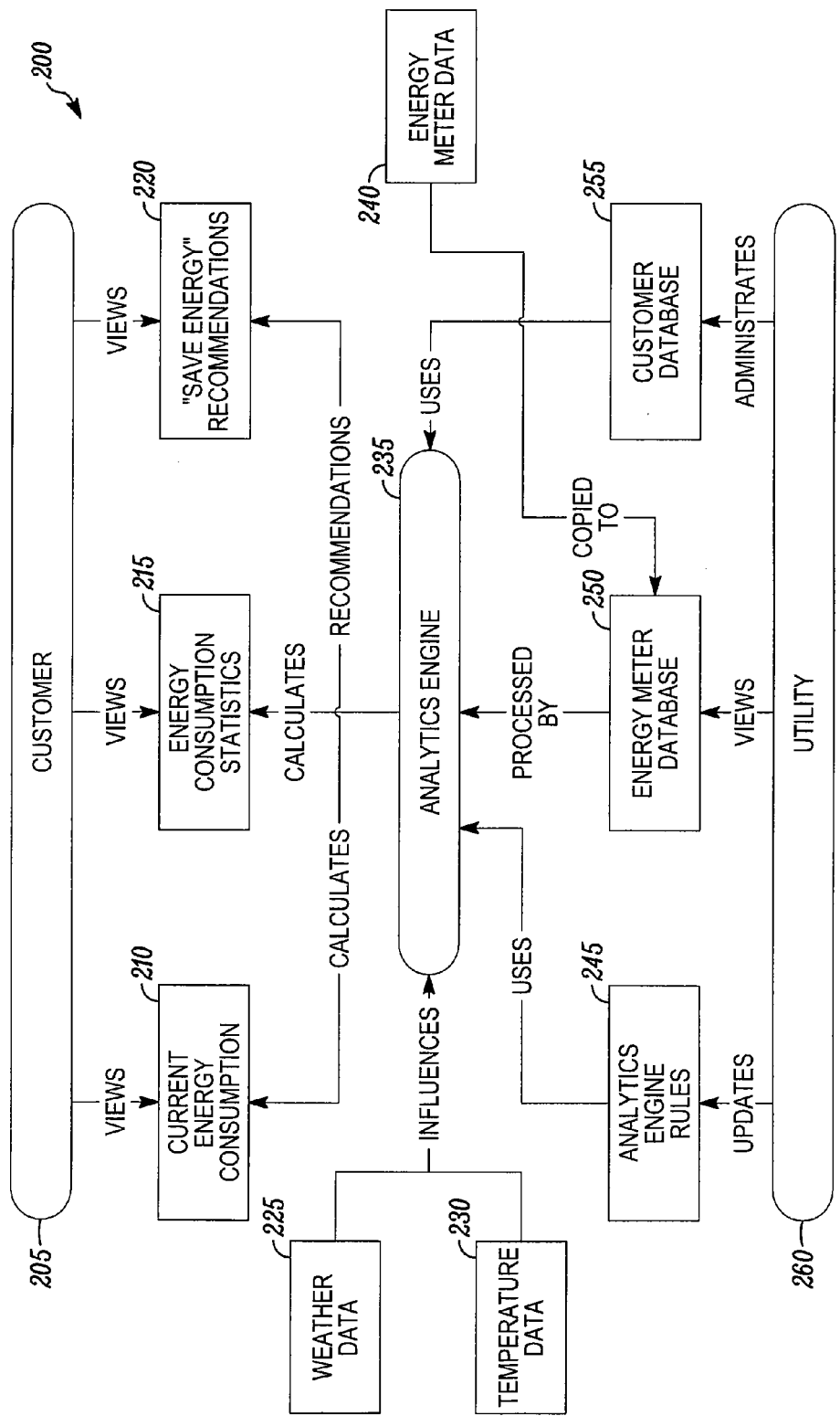
FIG. 2 is an example of a state diagram.
Figure 4:
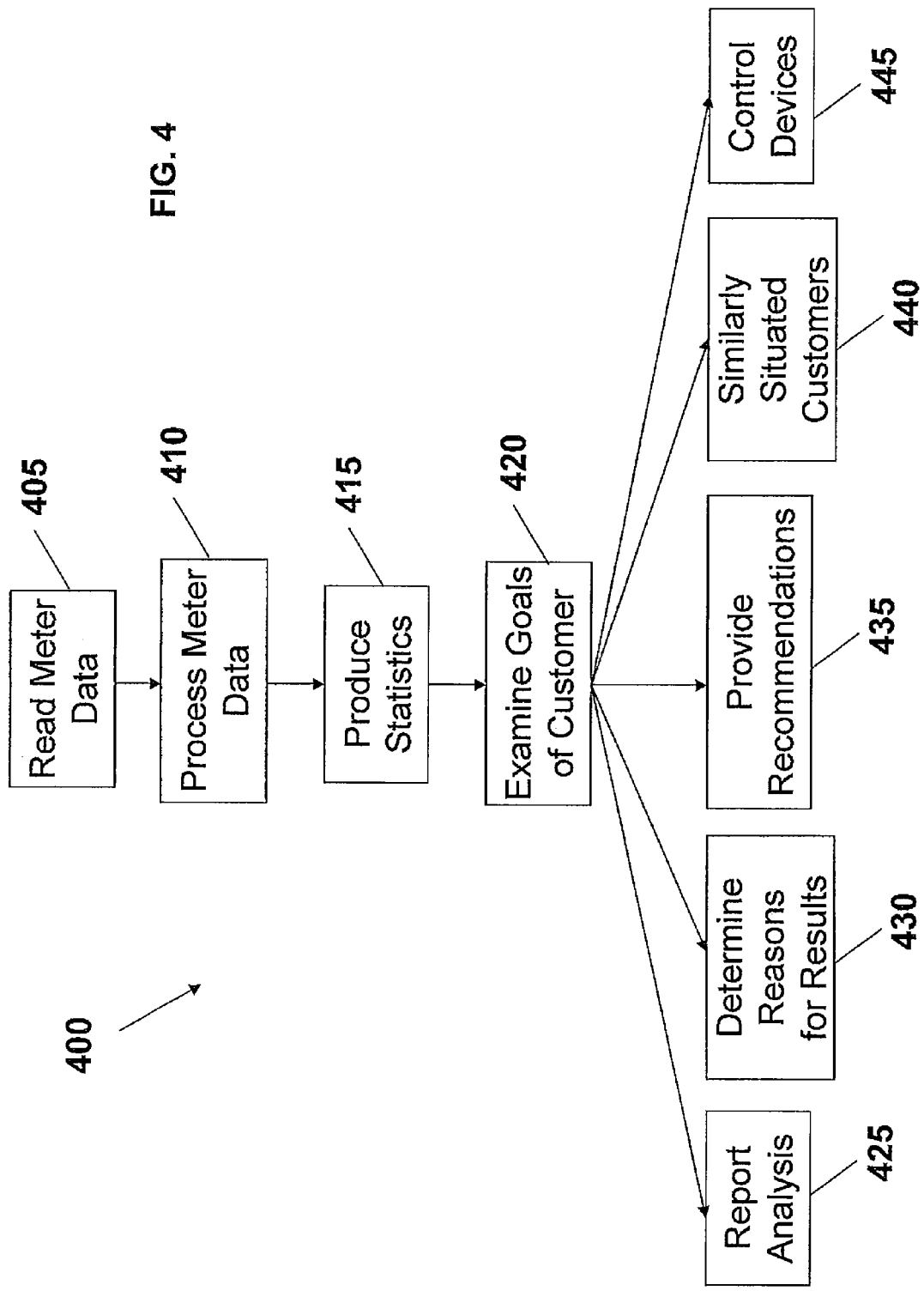
FIG. 4 is an example of a flow chart.

For example, the instructions to perform the actions illustrated in FIG. 4 (described below) may be included in the memory 124. The processor 122 may execute the programs in memory 124, and may receive inputs and send outputs via I/O to various other devices, as shown in FIG. 2.

The power system 130 may include the infrastructure of the power system (such as the power lines, substations, etc.). The power system 130 may further include the structure through which the utility management system 110 communications with one or more customer premises 140. The customer premises 140 may include one or more sensors 150 that generate data that is communicated, via communication block 160, to the utility management system 110. As discussed in more detail below, the data may be communicated in a variety of ways. For example, the data may be communicated using the infrastructure of the power system 130 (such as over a low voltage power line using standards-based power line technology) or may be communicate using one or more data communication busses associated with the power system 130. As another example, the data may be communicated through the Internet and/or through a wired or wireless telephone line.

The sensor 150 may comprise a Smart Meter that generates data as real-time or near real-time reads, power outage notification, and power quality monitoring. For example, the Smart Meter may include one or more functionality, including meter reading for billing at a predetermined interval (such as monthly), two-way communication between the customer premises 140 and the utility management system 110, outage detection, and remote reconnects and disconnects.

In this way, the Smart Meter may provide more information than traditional electrical meters, which only measure total consumption and as such provide no information of when the energy was consumed. Moreover, as discussed in more detail with respect to FIG. 3, the Smart Meter may comprise an interface between the customer premises and the utility management system 110. In particular, data from multiple sensors (strategically generating data from various electronic devices in the customer premises) may be forwarded to the Smart Meter for transmission to the utility management system 110. The data forwarded to the utility management system 110 may include more than real-time reads of power consumption, but a break-down of the power consumption for various electronic devices in the customer premises. This break-down may assist in analyzing the power consumption at the customer premises and in providing recommendations to reduce power consumption. Or, the analysis to determine the breakdown of the power consumption (including consumption of individual appliances at the customer's premises) may be performed at the utility management system 110, as discussed in more detail below.

FIG. 2 is an example of a state diagram 200 of the interaction of the customer 205 and the utility 260. The utility 260 manages the analytics engine 235 using analytics engine rules 245, an energy meter database 250, and a customer database 255. The utility 260 may update the analytics engine rules 245 to add functionality to the analytics engine 235. Moreover, the energy meter database 250 may receive data from energy meter data 240. Energy meter data 240 may receive data from sensors 150 resident at the customer premises. Alternatively, the data sent from sensors 150 may be sent directly to the energy meter database 250. Further, the analytics engine 235 may access data relating to the customer resident at the customer premises (such as a customer profile). As discussed in more detail below, the customer profile may include data specific to the customer that may be used by the analytics engine 235.

The analytics engine 235, using the analytics engine rules 245, the energy meter database 250, the customer database 255, weather data 225, and temperature data 230, may generate calculations and recommendations for the customer 205. For example, the analytics engine 235 may calculate current energy consumption 210, as discussed in more detail with respect to FIG. 5. The customer may view the current energy consumption 210 via an Input/Output device dedicated to communication with the utility 260 (such as a display associated with the Smart Meter). Or, the customer may view the current energy consumption 210 via a computer, a PDA, and/or a mobile telephone. In addition, the analytics engine may generate energy consumption statistics 215 and/or recommendations to "save energy" 220, as discussed in more detail with respect to FIG. 5.

Figure 3:
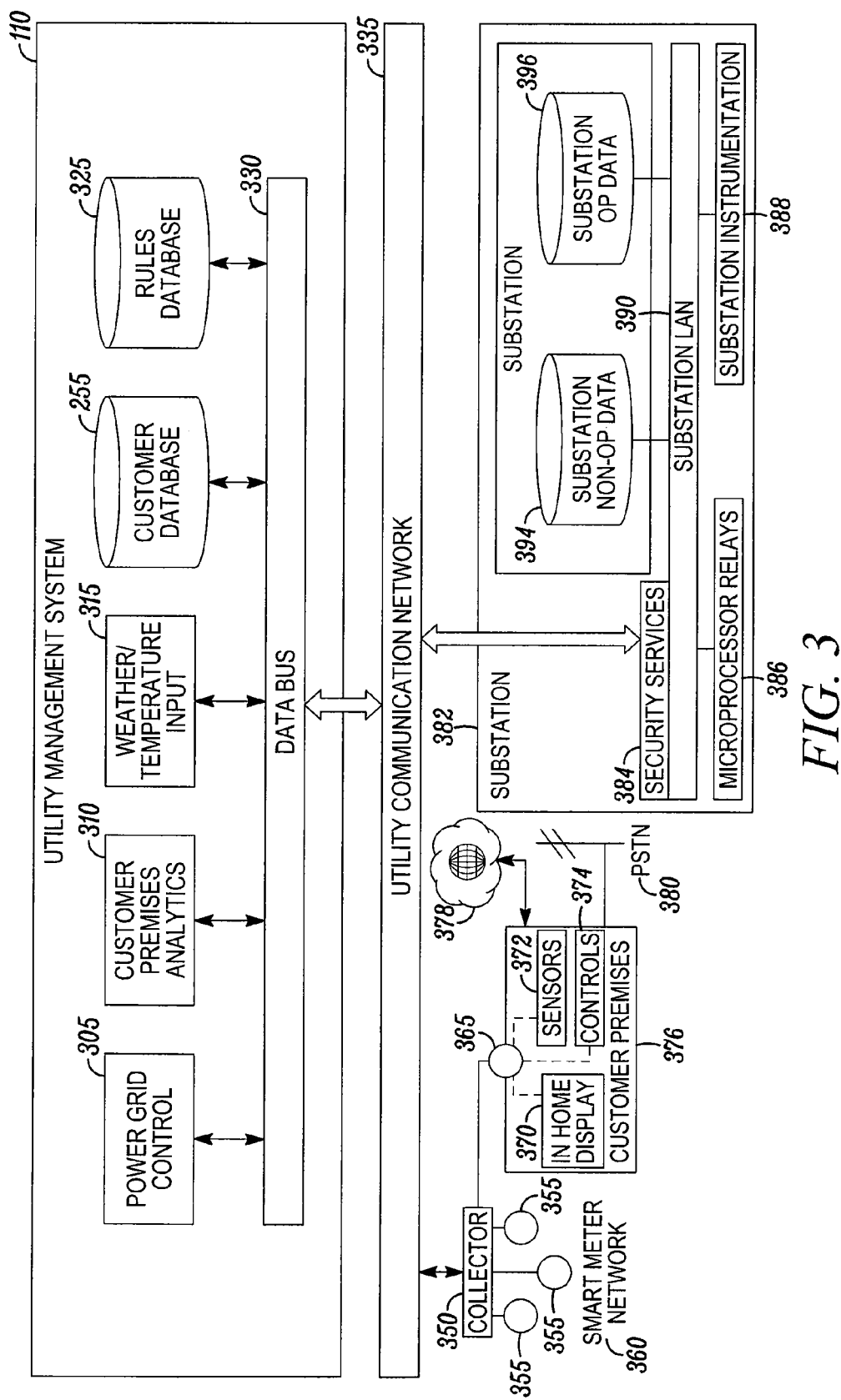
FIG. 3 is a block diagram of the configuration depicted in FIG. 1, with additional detail.

FIG. 3 is a block diagram of the configuration depicted in FIG. 1, with additional detail. FIG. 3 depicts the utility management system 110, which includes power grid control 305 for monitoring and controlling the power grid, customer premises analytics 310 which may include analytics engine 235, weather/temperature input 315, customer database 235, and rules database 325 which may include analytics rules 245. The utility management system 110 uses data bus 330 to communicate with internal components and with utility communication network 235.

The customer premises 376 includes one or more Smart Meters 365, an in-home display 370, one or more sensors 372, and one or more controls 374. In practice, sensors 372 may register data at one or more devices at the customer premises 376. For example, a sensor may register data at various major appliances within the customer premises 376, such as the furnace, hot water heater, air conditioner, etc. The data from the one or more sensors 372 may be sent to the Smart Meter 365, which may package the data for transmission to the utility management 110 via utility communication network 235. In this way, the data sent from the customer premises 376 may be sufficient for the analytics engine 235 to provide recommendations for reducing power consumption. The in-home display 370 may provide the customer at the customer premises 376 with an output device to view, in real-time, data collected from Smart Meter 365 and the one or more sensors 372. Further, the customer may use the in-home display 370 to view the results of the analytics engine 235, such as energy consumption, energy statistics, and energy saving recommendations. In addition, an input device (such as a keyboard) may be associated with in-home display 370 so that the customer may communicate with the utility management system 110. In one embodiment, the in-home display may comprise a computer resident at the customer premises 376.

The customer premises 376 may further includes controls 374 that may control one or more devices at the customer premises 376. As discussed in more detail below, various appliances at the customer premises 376 may be controlled, such as the heater, refrigerator, air conditioner, etc., depending on the results of the analytics engine 235. The control of the various appliances may be entirely local control, such as a manual or automatic control that is entirely resident within the customer's premises. Or, the control of the various appliances may be at least partly remote, such as a command sent from the utility management system 110 to direct control electronics resident at the customer's premises to control one or more appliances, as discussed in more detail with respect to FIG. 6.

As depicted in FIG. 3, the customer premises 376 may communicate in a variety of ways, such as via the Internet 378, the public-switched telephone network (PSTN), or via a dedicated line (such as via collector 350). Via any of the listed communication channels, the data from one or more customer premises may be sent. As shown in FIG. 3, one or more customer premises may comprise a Smart Meter Network 360, sending data to a collector 350 for transmission to the utility management system 110 via the utility management network 335. One example of the utility management network 335 to communicate the data from the Smart Meters to the utility management system 110 is disclosed in U.S. application Ser. No. 12/378,102, filed on Feb. 11, 2009 (published as U.S. Patent Application No. 2009-0281674A1 on Nov. 12, 2009), which is hereby incorporated by reference in its entirety.

FIG. 3 further illustrates a high-level architecture of a substation 382. The substation shown in FIG. 3 is representative of one substation in the power grid. The power grid may include a plurality of substations. The substation 382 may include data security services 384 used for security when communicating with utility communication network 335. The substation 382 may further include substation non-operation data database 394 (storing non-operational data related to performance and/or health data for the substation 382) and substation operation data database 396 (storing real time grid state data). The substation 382 may also include substation instrumentation 388 and substation FIG. 4 is an example of a flow chart that may be executed by analytics system 120. As shown at block 405, meter data is read. The data may be generated by a Smart Meter. Or, the data may be generated by a sensor, such as sensor 372 depicted in FIG. 3, and forwarded to the Smart Meter. The data may then be processed, as shown at block 410. The processing of the data may be performed locally (i.e., at the customer premises) or may be performed centrally (i.e., at the utility management system) after transmission of the data from the customer premises.

The analytics system 120 may analyze the data generated by the Smart Meter in order to determine the one or more appliances that are operating at the customer's premises. As discussed in copending application entitled "System And Method For Electric Patterns Discovery," European Application No. 09305779.2, incorporated by reference herein in its entirety, the Smart Meter may generate a customer load profile for the customer's premises. The load profile is a measure of all of the devices that draw load in real-time. For example, an electricity load profile includes the aggregation of the loads for all of the devices that are drawing power in real-time.

The analytics system 120 may automatically analyze the customer load profile in order to determine the one or more devices that contribute to the load profile. For example, the analytics system 120 may use statistical analysis (such as a maximum a posteriori (MAP) estimate) to recognize predetermined electrical patterns in the electricity load profile in order to identify the one or more devices that contribute to the electricity load profile. A database of known load patterns (which may be stored in customer database 255) may be used to recognize the electrical patterns. Specifically, one or more characteristics of the known load patterns may be used to disaggregate the customer load profile. For example, the "on"/"off" steps, events time-pattern, and steady state variations of the known load pattern may be compared against the customer load profile in order to determine whether these characteristic(s) match the customer profile.

The disaggregation of the customer load profile may have several applications. On the customer side, the analysis of the customer load profile may be used to determine what appliances are resident at the customer premises. For example, the customer load profile may be used to determine the appliances at the customer premises (such as number of heaters) or may be used to determine the type of appliances at the customer premises (such as the make and/or model of the heaters).

The analysis may also be used to determine the energy or water usage of a particular appliance for a predetermined period (such as for a time period of one day). The information may then be used to educate the customer, such as informing the customer about how much energy is used daily for the particular appliance. Or, the energy usage information may be compared with a comparable appliance to determine if the appliance is operating efficiently. This efficiency information may be provided to the user.

The data may then be analyzed to produce statistics, as shown at block 415. The statistics may comprise averaging of the data, trend analysis, comparison with one or more other customer profiles, etc. For example, the analysis may comprise determining a carbon footprint for the customer's premises and/or comparing the determined carbon footprint with one or more other customer's premises. A carbon footprint may comprise the total set of GHG (greenhouse gas) emissions caused directly and indirectly by an individual, organization, event or product. One example of determining the carbon footprint may include analyzing the power consumption at the customer's premises. This power consumption information may be aggregated with other information at the utility in order to better understand the power consumption. For example, the other information at the utility may include similarly situated customers (and analysis of the consumption of the similarly situated customers to determine a relative carbon footprint. As another example, the other information may include toxicity information of the power consumed. In particular, toxicity may vary over the course of a day. The variance may be due to the toxicity of the power sources, with energy generated by a nuclear power plant have a different toxicity than the energy generated from a coal-fired power plant. Because different energy generating sources contribute different toxicities, the carbon footprint may vary during the day based on the energy generating sources and based on the levels of power consumption at the customer's premises. Because the analysis is performed at the central utility, these variable toxicities may be taken into account in order to determine a more meaningful determination of the carbon footprint for a particular customer's premises. Once the size of a carbon footprint is known, a strategy can be devised to reduce it, as discussed in more detail below.

The determined carbon footprint may be compared with a previously determined carbon footprint for the customer's premises (including a previously determined carbon footprint at a similar time, such as during a particular month of the year) in order to determine whether the carbon footprint is increasing or decreasing. In the comparison with other customer's premises, the comparison may be with a similarly situated customer, including similarly situated environment (such as size of house, time of year, etc.)

For example, the statistics may provide an indication of current energy usage, which may be subsequently reported to the customer as described below. As another example, the data may be analyzed in order to determine whether there are any trends in the data. The data, which may be stored in customer database 255, may be analyzed for a predetermined period (such as 1 day, 1 week, 1 month, etc.). The data may then be used to determine whether there is a trend in the predetermined period. Or, the data may be used to determine whether there is a trend in order to predict power consumption into the future. As still another example, the customer profile may be examined in order to find another similarly situated customer profile (e.g., examining another customer profile with a similar house size, similar appliances used, climate, etc.).

After producing the statistics, the goals of the customer may be examined and compared with the statistics, as shown at block 420. The goals of the customer may be stored in customer database 255. The goals may include (1) energy usage reduction (such as reduction of one's carbon footprint); (2) comparison of the customer's energy usage with a predetermined energy usage (such as comparison to determine whether a customer's energy usage is consistent with what is expected for the customer's premises); (3) savings on utility bill; (4) fixed bill; and/or (5) potential tax savings. The above-listed goals are merely for exemplary purposes only. Other goals may likewise be assigned to the customer.

For example, if the goal of the customer is energy reduction (or carbon footprint reduction), the analytics engine may determine ways in which to reduce energy consumption. In particular, the goal may be an upper threshold for the power consumption (such as a predetermined number of MW as set or defined by the customer) during a determined time duration (such as during a single hour, single day, single week, single month, etc.). Specifically, the analytics engine may access the customer profile in the customer database 255 to determine the appliances currently used at the customer premises. The analytics engine may then make recommendations as to how to operate the appliances or which appliances to purchase in order to reduce energy consumption (such as lower the temperature on the hot water heater, upgrade the hot water heater, etc.). The recommendations may be ranked, such as prioritized using a cost/benefit analysis.

As another example, a goal of the customer may be to maintain a fixed power bill during a predetermined period (such as spending EUR 100 per month yearly). The analytics engine may analyze current power usage and recommend what changes may need to be made in order to accomplish this goal, again with the recommendations being ranked.

As still another example, the goal of the customer may be tax savings, such as regulations providing credits for energy efficiency (e.g., receiving a tax credit for purchasing a more efficient washer/dryer). The analytics engine may determine recommendations for actions by performing a cost/benefit analysis. Still another goal is education of the customer. The analytics engine may access the customer profile to determine actions that affect energy consumption and determine the energy impact of the actions.

Based on the comparison of the statistics with the goals of the customer, one or more actions may be taken. For example, the analysis may be reported, as shown at block 425, with the report to the user being displayed on in-home display 370 illustrating the calculated statistics and the trend analysis. Another action may comprise reporting one or more reasons for the results of the statistics, as shown at block 430 (such as reasons why for the power consumption). Still another action may include providing recommendations to the customer, as shown at block 435. The recommendations may include suggestions as to what actions to take, what products to buy, what products to replace, etc. Yet another action may comprise reporting results of similarly situations customers, as shown at block 440. In particular, the analytics engine may determine which other customers are similarly situated (such as in the same housing development, apartment complex, etc.) and a report as to a comparison of the power consumption of the customer premises with other customer premises (such as whether the customer consumes more or less power). Finally, another action may comprise controlling one or more devices, as shown at block 445. For example, one or more devices may be controlled remotely (such as illustrated by control 374 in FIG. 3 or in more detail in FIG. 6). The analytics engine may generate a command that is sent to the one or more appliances to modify operation of the device (such as turning the device on or off).

Figure 5:
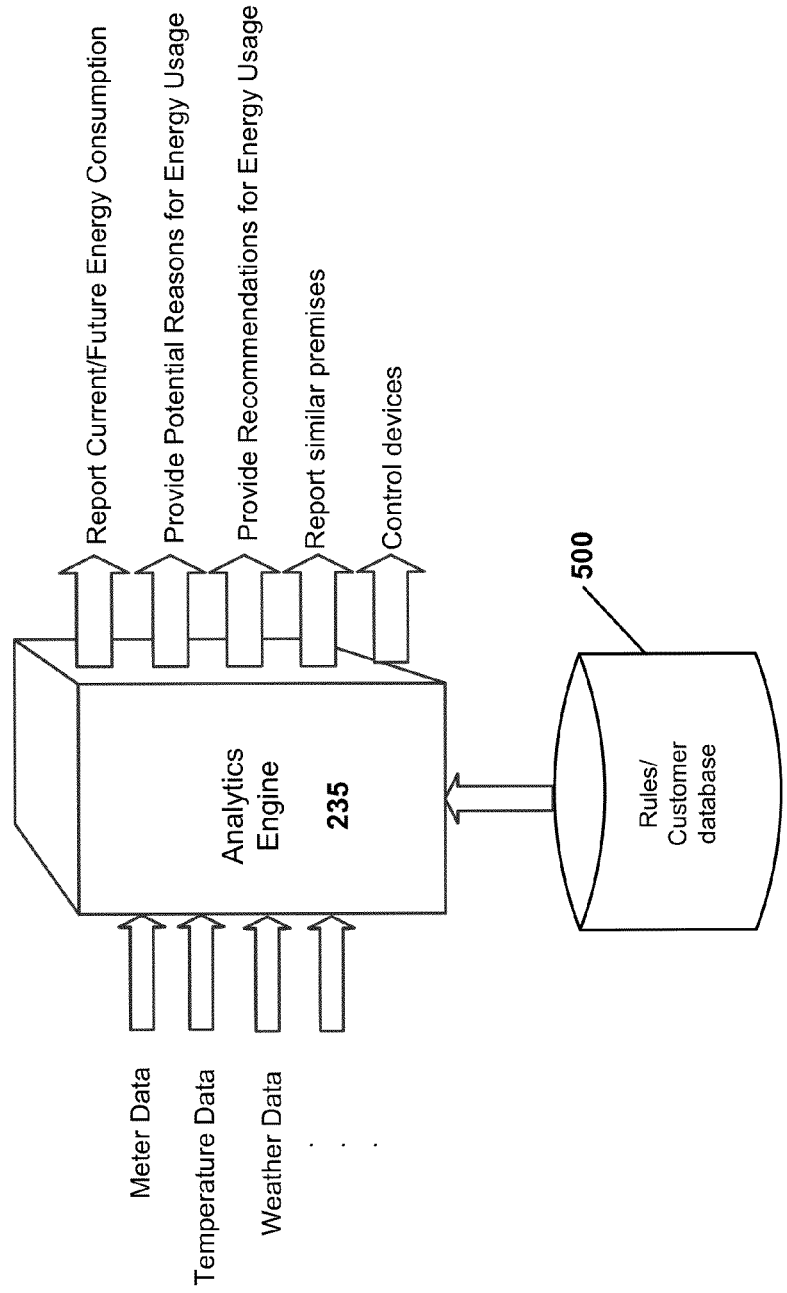
FIG. 5 is a block diagram of the inputs and outputs for the analytics engine.

FIG. 5 is a block diagram of the inputs and outputs for the analytics engine 235. As shown, the analytics engine 235 may receive one or more inputs, including meter data, temperature data, and weather data. The analytics engine 235 may further generate one or more outputs, including reporting current and/or future energy consumption, providing potential reasons for energy usage, providing recommendations for reducing energy usage, reporting similarly situated customers, and controlling one or more devices at the customer premises.

Figure 6:
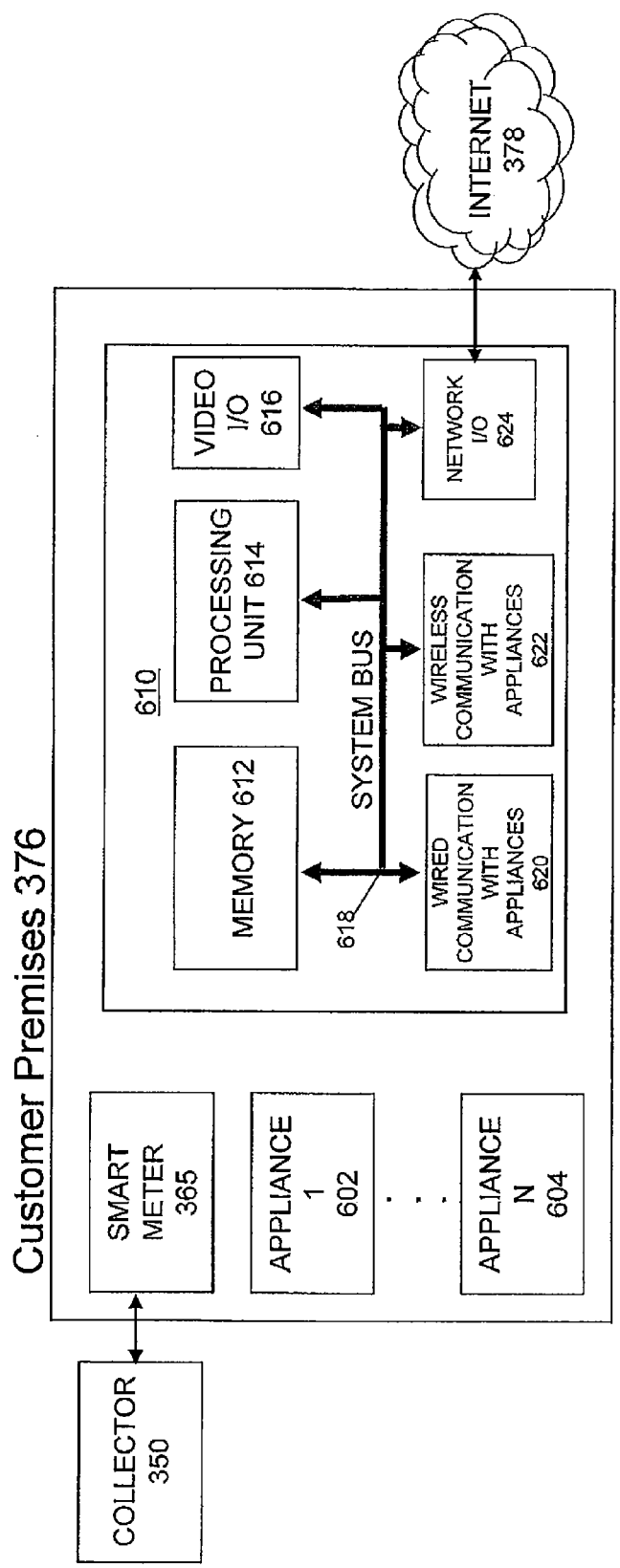
FIG. 6 is an expanded block diagram of the customer premises.

FIG. 6 is an expanded block diagram of the customer premises 376 illustrating one example of the hardware for a home communications network and for controlling one or more appliances at the customer premises 376. As discussed above, one or more appliances (such as appliance 1 (602) to appliance N (604)) may be controlled at the customer premises 376. In order to communicate with the appliances 602, 604, the appliances 602, 604 may be nodes in a home communication network. The central node in the home communication network may comprise a home computer 610. The home computer 610 may comprise a desktop computer or a laptop computer, or may comprise a computer dedicated to the functions described herein. Another node in the home communication network may include the smart meter 365.

The home computer 610 may function as a server, receiving one or more commands from the utility management system 110, and routing the commands to the one or more appliances 602, 604. Likewise, the home computer may route messages (such as status messages, confirmation of turning off an appliance, etc.) from the one or more appliances 602, 604 to the utility management system 110. And, the home computer may route messages from one appliance (such as 602) to another appliance (such as 604). In this way, the communication among the appliances may be centralized (via the home computer 610) instead of decentralized (communicating directly from one appliance to another). This centralized form of communication may be of benefit, particularly with appliances that may not be able to communicate directly with one another, such as appliances that communicate via different protocols. As one example, if a first appliance communicates via a first format and a second appliance communicates via a second format, the home computer 610 may act to translate an incoming message in the first format from the first appliance to the second format for communication to the second appliance. Using the system bus 618, the processing unit 614 may access look-up tables in the memory 612 of the home computer 610 in order to perform translations from the first format into the second format. Or, the memory 612 of the home computer 610 may include look-up tables for the processing unit 614 to perform translations to/from the first format into a generic format and to/from the second format into the generic format.

As discussed above, the utility management system 110, based on the analytics engine 235, may send a command to one or more appliances 602, 604 at the customer premises. The command may be based on one or more customer criteria, one or more utility criteria, or both.

In particular, the analytics engine 235 may analyze the current or upcoming expected usage of the customer premises for various customer criteria, such as energy savings, carbon footprint, etc. to command one or more appliances at the customer premises. For example, if the price of electricity changes periodically (such as every 5, 10, or 15 minutes), the analytics engine 235 may send commands in order to reduce the overall cost of operating the appliances. The analytics engine 235 may determine the currently operating appliances, such as by using dedicated sensors on the appliances that transmit information indicative of the operation of the appliances through the home computer 610 to the utility management system 110 or by disaggregation analysis using European Application No. 09305779.2.

The analytics engine 235 may then analyze the current pricing as well as the future pricing to determine whether or when to control the appliances. Specifically, if one of the appliances is a dishwasher, the analytics engine 235 may send a command to the home computer 610 to command the dishwasher to turn on at a predetermined time (such as in the middle of the night when electricity is typically cheaper). The analytics engine 235 may send the command to the home computer 610 in real-time (such as in the middle of the night when the dishwasher is commanded to operate). Or, the analytics engine 235 may send the command to the home computer 610 prior to the time when the command is executed with a scheduled time (such as a command to operate the dishwasher at the scheduled time of midnight several hours prior to midnight). The home computer 610 may receive the command from the analytics engine 235, and then send the local command from the home computer 610 to the appliance at the scheduled time. Or, the home computer 610 may send the local command to the appliance (with the scheduled time) to the appliance when the command is received by the home computer 610, and the appliance may then execute the command at the scheduled time. As another example, certain functions of the appliance may be turned on or off based on pricing. In the case of a refrigerator, defrosting of the refrigerator (which may be energy intensive) may be performed at different times. In order to reduce the energy cost, the analytics engine may send a command (via the home computer 610) to the refrigerator to defrost at a scheduled time when the price of energy is lower.

The analytics engine 235 may also analyze the current or upcoming expected usage of the customer premises for various utility criteria, such as total amount of energy used on the power grid. As part of a demand response system, the utility management system 110 may send a command to the home computer 610 of the customer premises 376 to reduce the consumption of power. The command from the utility management system 110 may be a specific command to turn off a particular appliance (such as turning off the air conditioner). Or, the command from the utility management system 110 may be a general command to reduce power consumption by a specific amount of power (such as 10 KW). The home computer 610 may receive the command and then determine the one or more appliances whose operation needs to be altered to reduce the power consumption by the specific amount of power. For example, the home computer 610 may determine that modifying the operation of more than one appliance may result in the desired reduction of power consumption, such as modifying the operation of the air conditioner (e.g., raising the set temperature of the air conditioner) and turning off the dishwasher. After the reduction in power consumption has taken place at the customer premises 376, the home computer 610 may report the reduction to the utility management system. In this way, the customer may previously input data, using the home computer 610, regarding control of the appliances that may be subject to demand response in order for the customer to better control the appliances while still providing the demanded reduction in power consumption. In particular, the customer may input a priority list via video I/O 616 indicating the sequence of appliances that would be subject to demand response, such as first controlling the dishwasher, next controlling the air conditioner, then controlling the hot water heater, etc. Further, the customer may input parameters by which to control one or more appliances, such as a range of acceptable set-point temperatures to adjust for the air conditioner (e.g., raise the set-point temperature to between 80° to 85°, depending on the amount of power reduction requested.

Or, the command from the utility management system 110 may comprise a command to switch the source of power for one or more appliances. In certain instances, the customer premises may include a generation source, such as one or more solar panels. The utility management system 110 may send a command to the home computer 610 for one, some, or all of the appliances to stop drawing power from the power grid and draw power from the generation source. In still another embodiment, the command from the utility management system 110 may comprise a command to route power generated at the customer premises to a portion of the power grid (as discussed in more detail below). The home computer 610 may also control the one or more appliances resident at the customer premises without a command sent from the utility management system. For example, in the case where a customer premises has one or more generation sources, the home computer 610 may determine an amount of energy generated by the solar panels and control the appliances accordingly. At times, the generation sources may have more energy than is necessary to operate the current appliances in use, such as at mid-day. The home computer 610 may determine an amount of energy that is in excess of what is required, select one or more appliances that can use the excess energy, and control the appliances accordingly. For example, if the excess capacity is "X" KW, the home computer 610 may instruct the refrigerator to defrost, instruct the freezer to reduce its temperature by one or more degrees, heat up the coils of the dryer, etc. in order to efficiently use the excess energy. In this way, the excess energy may be used in the event that it cannot be stored for later use. Also, in the case of varying pricing for electricity, the customer may sell the electricity back to the grid. In one embodiment, the home computer 610 can select when to use and when to sell energy generated by the generator resident at the customer premises. In particular, the user may program the memory 612 of the home computer 610 for conditions whereby the electricity would be sent back to the grid (such as a minimum price, or a range of prices, under which the electricity would be sent back to the grid). In a second embodiment, the analytics system 120 resident at the utility management system may make the decision whether the generator should sell the electricity back to the grid. In particular, the analytics system 120 may receive data (communicated via home computer 610) indicative of the amount of electricity generated at the customer premises and/or the amount of electricity available for routing to the power grid (in the event that a portion of the electricity generated at the customer premises is for use at the customer premises). The analytics system 120 may then issue a command to the customer premises (in one embodiment sending the command to the home computer 610 with the home computer 610 issuing a command to the generator to route the power to the power lines that comprise the power grid, and in a second embodiment sending the command directly to the generator). The analytics system 120 may make the determination whether to send the command based on: (1) the amount of electricity generated at the customer premises; (2) the amount of electricity available for routing to the power grid; (3) the minimum price, or a range of prices, under which the electricity would be sent back to the grid; (4) the amount of current power consumption in the grid; or any combination thereof.

The utility management system 110 may communicate with the home computer 610 in one of several ways, such as via the Internet 378 (using a network I/O card 624) or via the smart meter 365. In this way, the utility management system 110 need not communicate directly with the one or more appliances resident at the customer premises 376. Instead, communications between the utility management system 110 and the appliances may be routed through (and controlled by) the home computer 610.

The home computer 610 may communicate with various nodes in the home communication network (such as the smart meter 365, appliance 1 (602), etc.) in one or more ways, such as via wired and/or wireless communication (using wired communication with appliances 620 or wireless communication with appliances 622, respectively.

One example of wired communication may include Power Line Communication Systems (PLC) in which a modulated carrier signal is impressed on the customer premises wiring system. In particular, PLC may be used to send coded signals along a home's existing electric wiring to programmable switches, or outlets. These signals convey commands that correspond to "addresses" or locations of specific devices, and that control how and when those devices operate. The home computer 610 may activate a PLC transmitter, for instance, which can send a signal along a home's wiring. A receiver plugged into any electric outlet in the home could receive that signal and operate the appliance to which it is attached.

Another example of wired communication may include an additional bus (such as a two-wire bus) installed along with normal electric wiring. Sometimes termed "Instabus", this two-wire bus may link all appliances to the home computer 610. Thus, the additional bus may enable a centralized, rather than a decentralized communication system. Examples of wireless communication may include IEEE 802.11 or IEEE 802.15.4-2003 (ZigBee).

Further, the one or more appliances 602, 604 may be configured with additional hardware in order to communicate with the home computer 610 and in order to implement commands sent from the utility management system 110 (via the home computer 610). A new generation of appliances, at times referred to as "smart appliances", include software and hardware enabling the appliances to receive commands (such as wireless commands) and to execute the commands (such as to turn an appliance off, to delay an action that the appliance may take (such as defrosting a refrigerator), etc.). Or, additional hardware may be installed in conjunction with existing appliances. The additional hardware may comprise a device to interface between the wall socket and the appliance. This interface device may be considered a node in the home computing network, whereby the home computer 610 may send a command to shut-off the appliance to the node. The interface device may then stop the flow of power from the wall socket to the appliance.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention of the Applicants to protect all variations and modification within the valid scope of the present invention. It is intended that the invention be defined by the following claims, including all equivalents.

The invention claimed is:

1. A central power utility management system comprising:
a processor;
a memory storage device configured to store at least one database arranged to store customer data for customers resident at a plurality of customer premises, the customer data comprising a customer goal for power consumption at respective customer premises, the customer goal being set by the customer resident at respective customer premises;
a receiver arranged to receive data at the central power utility management system from the plurality of customer premises, the data generated by one or more sensors at the plurality of customer premises and indicative of power consumption or power generation at respective customer premises; and
an analytics engine comprising analytical rules operable to, when executed by the processor, with respect to a first customer of the plurality of customers:
statistically analyze the data from the one or more sensors;
compare the statistically analyzed data with a respective goal of the first customer and with data aggregated from a premises of a second customer similarly-situated to the first customer, wherein the comparison with data aggregated from the premises of the similarly-situated second customer is to determine whether enemy usage of the first customer is consistent with what is expected for the premises of the first customer; and
generate a recommended action to be taken by the first customer responsive to the comparison, the recommended action adapted to bring the first customer closer to reaching the respective goal of the first customer, the recommended action related to a change in operation or a replacement of a device that consumes power and is resident at a premises of the first customer.

2. The power management system of claim 1, wherein the power management system also manages a power grid that distributes power to the customer premises.

3. The power management system of claim 2, wherein the one or more sensors are integrated with a meter device used arranged to measure an amount of power consumed at the customer premises.

4. The power management system of claim 3, wherein the one or more sensors send the data indicative of power consumption to the meter device in order for the meter device, using communication functionality of the meter device, to send the data to the power management system.

5. The power management system of claim 1, wherein the device resident at the first customer premises comprises an appliance; wherein at least one of the sensors generates real-time data for the appliance; and wherein the analytics engine is further operable to generate a command to modify operation of the appliance.

6. The power management system of claim 1, wherein the analytics engine is further operable to send a report to the first customer with a comparison of power consumption between appliances at the premises of the first and second customers.

7. The power management system of claim 1, wherein the statistical analysis comprises analysis of the data stored over a predetermined time period in order to determine power consumption over the predetermined time period.

8. The power management system of claim 7, wherein the statistical analysis comprises analysis of the data in order to generate a prediction of power consumption based on trends of power consumption.

9. The power management system of claim 8, wherein the device resident at the first customer premises comprises a generator; and wherein one of the sensors generates real-time data for the generator.

10. The power management system of claim 9, wherein the analytics engine is further operable to generate a command for routing power generated by the at least one generator to at least a portion of the power grid.

11. The power management system of claim 1, wherein the analytics engine is further operable to generate a command to control the device, and the device comprises an appliance, further comprising:
a smart meter resident at the first customer premises, the smart meter generating the data indicative of power consumption; and a computer resident at the first customer premises, the computer in communication with the smart meter and the appliance, the computer operable to receive the command and control the appliance based on the command.

12. The power management system of claim 11, wherein the computer is configured to route commands generated by the analytics engine to a plurality of appliances resident at the customer premises.

13. The power management system of claim 12, wherein the smart meter receives the command generated by the analytics engine and sends the command to the computer.

14. The power management system of claim 1, wherein the analytics engine is further operable to:
    access an attribute of the first customer, the accessed attribute selected from the group consisting of: similar house size; similar appliances; similar climate; and similar time of year; and
    select the similarly situated second customer using the accessed attribute.

15. The power management system of claim 1, wherein the analytics engine is further operable to:
    generate a plurality of recommendations for the first customer; and
    rank the plurality of recommendations using a cost/benefit analysis.

16. A central power utility management system comprising:
    a processor;
    a memory storage device comprising at least one database arranged to store customer data for customers resident at a plurality of customer premises, the customer data comprising a customer goal for power consumption at respective customer premises, the customer goal being set by the customer resident at respective customer premises;
    a receiver arranged to receive data at the central power utility management system from each of the plurality of customer premises, the data generated by one or more sensors at the plurality of customer premises and indicative of power consumption or power generation at respective customer premises; and
    an analytics engine comprising analytical rules operable to, when executed by the processor, and with respect to a first customer of the plurality of customers:
        statistically analyze the data from the one or more sensors;
        compare the statistically analyzed data with a respective goal of the first customer and with data aggregated from a premises of a second customer similarly-situated to the first customer, wherein the comparison with data aggregated from the premises of the similarly-situated second customer is to determine whether enemy usage of the first customer is consistent with what is expected for the premises of the first customer; and
        generate a recommended action to be taken by the first customer responsive to the comparison, the recommended action adapted to bring the first customer closer to reaching the respective goal of the first customer, the recommended action related to a change in operation or a replacement of a device that consumes power and is resident at a premises of the first customer.

17. The power management system of claim 16, wherein the statistical analysis comprises analysis of the data stored over a predetermined time period in order to determine power consumption over the predetermined time period.

18. A method comprising:
    accessing, by a processor, customer data from at least one database from a memory storage device, the customer data for customers resident at a plurality of customer premises and comprising a customer goal for power consumption at respective customer premises, the customer goal being set by the customer resident at respective customer premises;
    receiving, by a communication interface, data at a central power utility management system from the plurality of customer premises, the data generated by one or more sensors at the plurality of customer premises and indicative of power consumption or power generation at respective customer premises;
    statistically analyzing, by the processor, the data from the one or more sensors using an analytics engine comprising analytical rules;
    comparing, by the processor, the statistically analyzed data with a respective goal of a first customer and with data aggregated from a premises of a second customer similarly-situated to the first customer, wherein the comparison determines whether energy usage of the first customer is consistent with what is expected for the premises of the first customer; and
    generating, by the processor, a recommended action to be taken by the first customer responsive to the comparison, the recommended action adapted to bring the first customer closer to reaching the respective goal of the first customer, the recommended action related to a change in operation or a replacement of a device that consumes power and is resident at a premises of the first customer.

19. The method of claim 18, wherein the data comprises real-time data for at least one appliance resident at the customer premises, further comprising:
    sending, by the processor, a report to the first customer with a comparison of power consumption between appliances at the premises of the first and second customers.

20. The method of claim 19, further comprising:
    generating, by the processor, a command to control the device in accordance with the respective goal, wherein the command turns the at least one appliance on or off.

21. The method of claim 18, wherein statistically analyzing comprises analyzing the data stored over a predetermined time period in order to determine power consumption over the predetermined time period.

22. The method of claim 21, wherein statistically analyzing comprises analyzing the data in order to generate a prediction of power consumption based on trends of power consumption.

23. The method of claim 18, further comprising:
    accessing an attribute of the first customer, the accessed attribute selected from the group consisting of: similar house size; similar appliances; similar climate; and similar time of year; and
    selecting the similarly situated second customer using the accessed attribute.

24. The method of claim 18, further comprising:
    generating, by the processor, a plurality of recommendations for the first customer; and
    ranking the plurality of recommendations using a cost/benefit analysis.

* * * * *